United States Patent
Konishi et al.

(10) Patent No.: US 11,233,403 B2
(45) Date of Patent: Jan. 25, 2022

(54) GRID INTERCONNECTION SYSTEM

(71) Applicant: SAVE THE PLANET CO., LTD., Osaka (JP)

(72) Inventors: Hirofumi Konishi, Osaka (JP); Hideaki Souma, Osaka (JP)

(73) Assignee: SAVE THE PLANET CO., LTD., Osaka (JP)

( * ) Notice: Subject to any disclaimer, the term of this patent is extended or adjusted under 35 U.S.C. 154(b) by 0 days.

(21) Appl. No.: 17/039,162

(22) Filed: Sep. 30, 2020

(65) Prior Publication Data
US 2021/0167604 A1 Jun. 3, 2021

(30) Foreign Application Priority Data
Nov. 29, 2019 (JP) .............................. JP2019-217243

(51) Int. Cl.
*H02J 7/00* (2006.01)
*H02J 3/38* (2006.01)
*H02M 7/5387* (2007.01)

(52) U.S. Cl.
CPC ............ *H02J 3/381* (2013.01); *H02J 7/0068* (2013.01); *H02M 7/5387* (2013.01); *H02J 2203/10* (2020.01); *H02J 2300/24* (2020.01)

(58) Field of Classification Search
CPC ...... H02J 3/381; H02J 7/0068; H02J 2300/24; H02J 2203/10; H02J 7/00; H02J 3/38; H02M 7/5387
See application file for complete search history.

(56) References Cited

U.S. PATENT DOCUMENTS

2017/0331372 A1* 11/2017 Miki ..................... H01M 10/46

FOREIGN PATENT DOCUMENTS

JP        2015-15855 A      1/2015

* cited by examiner

*Primary Examiner* — Robert L Deberadinis
(74) *Attorney, Agent, or Firm* — Maschoff Brennan

(57) ABSTRACT

The grid interconnection system is provided with a switching unit configured to switch a connection destination of an interconnection terminal of a first power conditioner and a load, between a power grid and a self-standing terminal of a second power conditioner, and a connection controller configured to execute, on the switching unit, first control for connecting the power grid to the interconnection terminal of the first power conditioner and the load in a non-power outage of the power grid, and second control for connecting the self-standing terminal of the second power conditioner to the interconnection terminal of the first power conditioner and the load in a power outage of the power grid.

6 Claims, 7 Drawing Sheets

GRID INTERCONNECTION SYSTEM

CROSS-REFERENCE TO RELATED APPLICATION

This application claims priority to Japanese Patent Application No. 2019-217243 filed on Nov. 29, 2019, the entire disclosure of which is incorporated by reference herein.

BACKGROUND

The present disclosure relates to a grid interconnection system capable of supplying power to a load in case of a power outage of a power grid.

Japanese Unexamined Patent Publication No. 2015-15855 discloses a grid interconnection system including: a first power conditioner configured to convert DC power output from a power generation unit to AC power and output the AC power from an interconnection terminal or a self-standing terminal to a load; and a second power conditioner capable of being actuated both in a discharge mode for converting power stored in a storage battery to AC power and outputting the AC power from a discharging terminal to the load and in a charge mode for converting AC power input to a charging terminal to DC power and supplying the DC power to the storage battery. In normal operation of this grid interconnection system, the first power conditioner is interconnected with the power grid to output the AC power from the interconnection terminal. On the other hand, in charging operation of the storage battery, the first power conditioner outputs the AC power from the self-standing terminal.

SUMMARY

The grid interconnection system according to the present disclosure includes: a first power conditioner configured to convert DC power output from a power generation unit to AC power corresponding to a voltage at an interconnection terminal and to output the AC power from the interconnection terminal to a load, and to be interconnected with a power grid with connection of the power grid to the interconnection terminal; a second power conditioner capable of being actuated both in a discharge mode for converting power stored in a storage battery to AC power and outputting the AC power from a self-standing terminal to the load and in a charge mode for converting AC power input to the self-standing terminal to DC power and supplying the DC power to the storage battery; a switching unit configured to switch a connection destination of the interconnection terminal of the first power conditioner and the load, between the power grid and the self-standing terminal of the second power conditioner, and a connection controller configured to execute, on the switching unit, first control for connecting the power grid to the interconnection terminal of the first power conditioner and the load in a non-power outage of the power grid, and second control for connecting the self-standing terminal of the second power conditioner to the interconnection terminal of the first power conditioner and the load in a power outage of the power grid.

DETAILED DESCRIPTION

Figure 1:
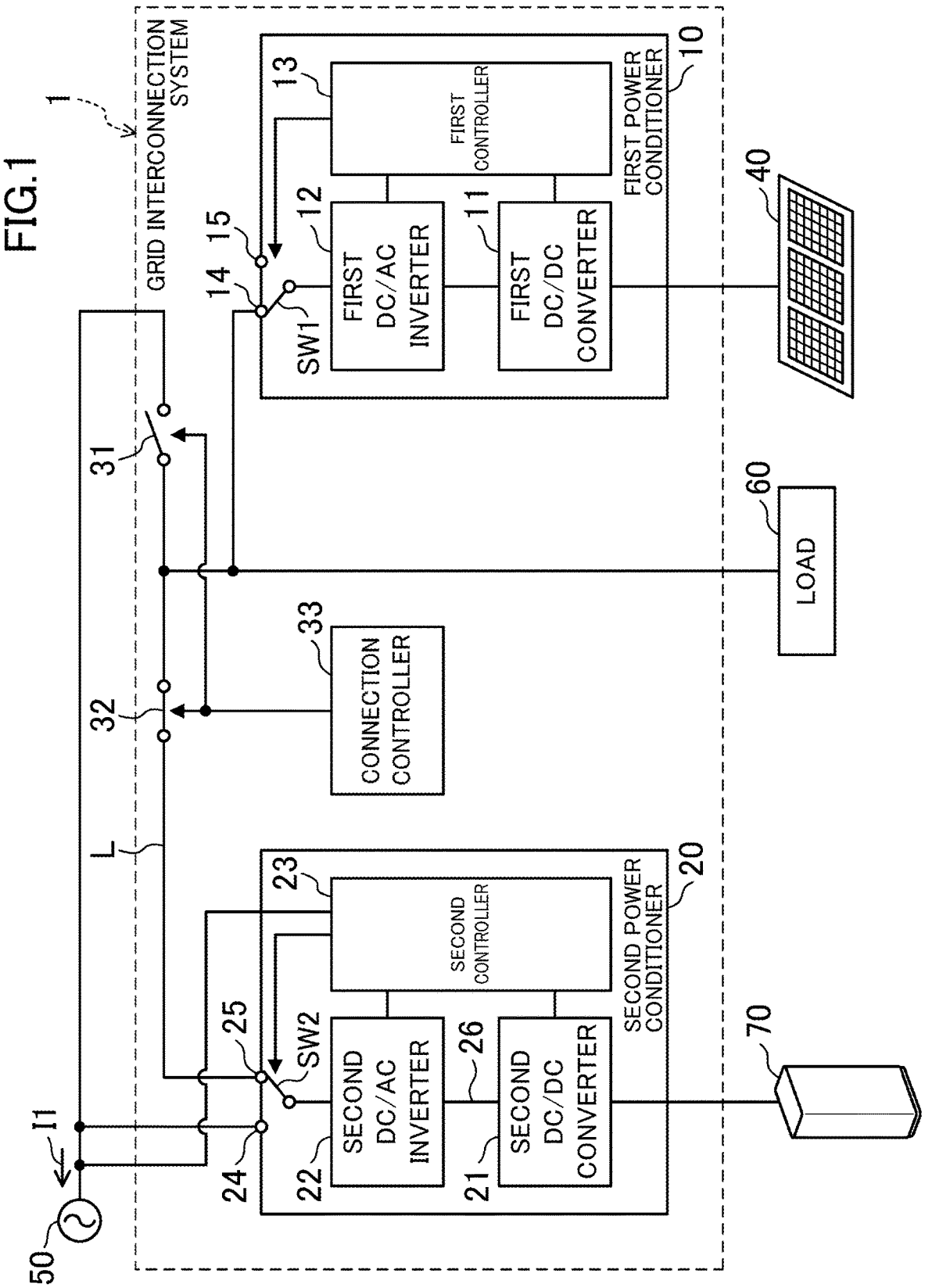
FIG. 1 is a block diagram illustrating a configuration of a grid interconnection system according to an embodiment.

There is a demand to charge storage batteries with power generated in power generation units in case of a power outage of a power grid. Japanese Unexamined Patent Publication No. 2015-15855 discloses charging of a storage battery in case of a non-power outage of a power grid, but does not disclose charging of a storage battery in case of a power outage of the power grid.

Moreover, Japanese Unexamined Patent Publication No. 2015-15855 requires a first power conditioner for charging only, which involves a problem of poor efficiency of using a facility for supplying power to the load.

The present disclosure has been made in view of the above problem, and it is an object of the present disclosure to make power generated in a power generation unit to be charged in a storage battery and to make power to be discharged from the storage battery to the load in case of a power outage.

In order to achieve the above object, in the grid interconnection system according to the present disclosure, a self-standing terminal of a second power conditioner is connected to an interconnection terminal of a first power conditioner at the time of power outage of the power grid.

Specifically, in an aspect of the present disclosure, the grid interconnection system according to the present disclosure includes: a first power conditioner configured to convert DC power output from a power generation unit to AC power corresponding to a voltage at an interconnection terminal and to output the AC power from the interconnection terminal to a load, and to be interconnected with a power grid when the power grid is connected to the interconnection terminal; a second power conditioner capable of being actuated both in a discharge mode for converting power stored in a storage battery to AC power and outputting the AC power from a self-standing terminal to the load and in a charge mode for converting AC power input to the self-standing terminal to DC power and supplying the DC power to the storage battery; a switching unit configured to switch a connection destination of the interconnection terminal of the first power conditioner and the load, between the power grid and the self-standing terminal of the second power conditioner, and a connection controller configured to execute, on the switching unit, first control for connecting the power grid to the interconnection terminal of the first power conditioner and the load in a non-power outage of the power grid, and second control for connecting the self-standing terminal of the second power conditioner to the interconnection terminal of the first power conditioner and the load in a power outage of the power grid.

With this configuration, the first power conditioner controls the sum of the output power of the first power conditioner and the charging power or discharging power of the second power conditioner to be always equal to the power consumed by the load, so that the AC voltage can be constant, which allows stable control.

Further, the interconnection terminal of the first power conditioner and the self-standing terminal of the second power conditioner are connected to each other in a power outage of the power grid. Accordingly, the AC power output from the interconnection terminal of the first power conditioner and the AC power output from the self-standing terminal of the second power conditioner are collectively supplied to the load in the discharge mode, while the storage battery is charged by inputting the AC power output from the interconnection terminal of the first power conditioner to the self-standing terminal of the second power conditioner in the charge mode.

Further, with connection of the interconnection terminal of the first power conditioner to the self-standing terminal of the second power conditioner in a power outage of the power grid, the first power conditioner outputs, from the interconnection terminal, an AC voltage having the same phase as the voltage at the self-standing terminal of the second power conditioner. This makes it possible to avoid asynchronous input causing the overcurrent flowing through the first power conditioner. Further, it is not necessary to provide, in the first power conditioner, a configuration for keeping the overcurrent from flowing in the first power conditioner in charging and discharging of the storage battery separately from a configuration for interconnecting with the power grid. This allows the manufacturing costs to be reduced.

In the above-described aspect, the second power conditioner may include: a DC/DC converter configured to convert an output voltage at the storage battery to a predetermined voltage and output the predetermined voltage to a DC bus in the discharge mode, and to convert a bus voltage at the DC bus and output a charging voltage at the storage battery in the charge mode; a DC/AC inverter configured to convert the bus voltage to an AC voltage and output the AC voltage from the self-standing terminal in the discharge mode, and to convert the AC voltage input to the self-standing terminal to a DC voltage and outputs the DC voltage to the DC bus in the charge mode; and a mode controller configured to switch an operation mode of the DC/DC converter and the DC/AC inverter, between the discharge mode and the charge mode in accordance with a measured value of at least one of the bus voltage, a voltage at the self-sustaining terminal, or a current in the DC/AC inverter.

This configuration allows the second power conditioner to automatically switch between the discharge mode and the charge mode.

In the above-described aspect, the measurement value may be of the bus voltage, and the mode controller may bring the operation mode to the charge mode if the bus voltage exceeds a predetermined threshold, and to the discharge mode if the bus voltage is lower than the predetermined threshold.

Embodiments of the present disclosure will be described with reference to the drawings.

FIG. 1 illustrates a grid interconnection system 1 according to an embodiment of the present disclosure. This grid interconnection system 1 includes: a first power conditioner 10; a second power conditioner 20; first and second connection switches 31 and 32; and a connection controller 33 as a connection controlling means.

The first power conditioner 10 includes: a first DC/DC converter 11, a first DC/AC inverter 12; a first switch SW1; a first controller 13; a single-phase three-wire first interconnection terminal 14; and a single-phase two-wire first self-standing terminal 15. The first power conditioner 10 converts DC power output from a solar battery panel 40, which is a power generation unit, into AC power corresponding to a voltage at the first interconnection terminal 14 and then outputs the AC power from the first interconnection terminal 14. When a single-phase three-wire power grid 50 is connected to the first interconnection terminal 14, the first power conditioner 10 is interconnected with the power grid 50 and outputs the AC power from the first interconnection terminal 14 to a load 60.

The first DC/DC converter 11 converts the output voltage at the solar battery panel 40 to a predetermined voltage and outputs the predetermined voltage.

The first DC/AC inverter 12 converts the output voltage at the first DC/DC converter 11 into an AC voltage and outputs the AC voltage. A switching element in the first DC/AC inverter 12 is controlled by a PWM signal output from the first controller 13.

The switch SW1 switches a terminal to which the AC power is output from the first DC/AC inverter 12, between the first interconnection terminal 14 and the first self-standing terminal 15 based on an instruction from the first controller 13.

The first controller 13 controls the first switch SW1. The first controller 13 brings the first interconnection terminal 14 to output the AC power output from the first DC/AC inverter 12.

The first controller 13 controls the first DC/AC inverter 12 based on the voltage at the first interconnection terminal 14 while bringing the AC power output from the first DC/AC inverter 12 to be output from the first interconnection terminal 14. Specifically, the first controller 13 receives a measured value of the voltage at the first interconnection terminal 14, generates a current command value of an active component, based on a sine value at a phase angle of the voltage at the first interconnection terminal 14, and generates a current command value of a reactive component, based on a cosine value at the phase angle of the voltage at the first interconnection terminal 14. The sine value and the cosine value at the phase angle of the voltage at the first interconnection terminal 14 are obtained from PLL that receives the voltage at the first interconnection terminal 14 as an input signal. Then, the first controller 13 acquires an output current command value by summing the current command value of the active component and the current command value of the reactive component. The output current command value has the same phase as the voltage at the first interconnection terminal 14. Then, the first controller 13 performs feedback control of a PWM signal so that the value of the output current of the first DC/AC inverter 12 follows the output current command value. Accordingly, with connection of the power grid 50 to the first interconnection terminal 14, the first power conditioner 10 can be interconnected with the power grid 50.

The second power conditioner 20 includes a second DC/DC converter 21, a second DC/AC inverter 22, a second switch SW2, a second controller 23 as a mode controller, a single-phase three-wire second interconnection terminal 24, and a single-phase three-wire second self-standing terminal 25. The second power conditioner 20 is capable of being actuated both in a discharge mode for converting power stored in a storage battery 70 to AC power and outputting the AC power from the second self-standing terminal 25 to the load 60 and in a charge mode for converting AC power input to the second self-standing terminal 25 to DC power and supplying the DC power to the storage battery 70. As the storage battery 70, a lithium ion battery or any other secondary battery can be used.

In the discharge mode, the second DC/DC converter 21 converts the output voltage at the storage battery 70 to a predetermined voltage and outputs the predetermined voltage to a DC bus 26. In the charge mode, the second DC/DC converter 21 converts the bus voltage $V_B$ (see FIG. 2) at the DC bus 26 and outputs the charging voltage at the storage battery 70.

In the discharge mode, the second DC/AC inverter 22 converts the bus voltage $V_B$ to an AC voltage and outputs the AC voltage from the second self-standing terminal 25. In the charge mode, the second DC/AC inverter 22 converts an AC voltage input to the second self-standing terminal 25 to a DC voltage and outputs the DC voltage to the DC bus 26.

Figure 2:
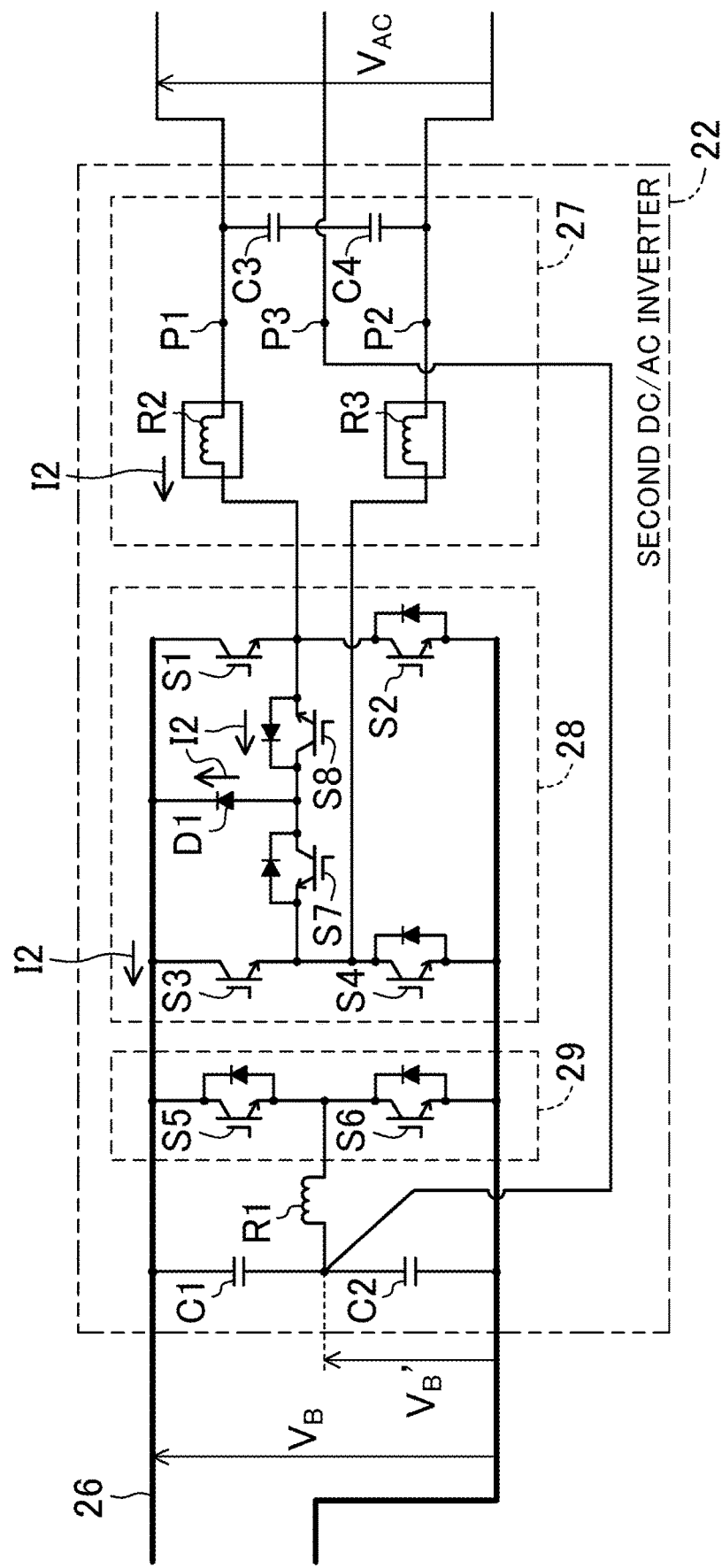
FIG. 2 is a circuit diagram illustrating a detailed configuration of a second DC/AC inverter.

As shown in FIG. 2, the second DC/AC inverter 22 includes an LC filter 27, a bridge circuit 28 including four switching elements S1 to S4, and a half-bridge circuit 29 including two switching elements S5 and S6. The switching elements S1 and S2 of the bridge circuit 28 are connected in series to each other, and the switching elements S3 and S4 of the bridge circuit 28 are connected to each other. The intermediate node between the switching elements S1 and S2 and the intermediate node between the switching elements S3 and S4 are connected to the second self-standing terminal 25 via the LC filter 27. The intermediate node between the switching elements S5 and S6 is connected to the second self-standing terminal 25 via a reactor R1, and is connected to the DC bus 26 via the reactor R1 and capacitors C1 and C2. A pair of switching elements S7 and S8 in connection with the respective collectors are connected in series to each other between the intermediate node placed between the switching elements S1 and S2 and the intermediate node placed between the switching elements S3 and S4. An intermediate node between these switching elements S7 and S8 is connected to an anode of a diode D1, and the DC bus 26 is connected to a cathode of the diode D1.

The LC filter 27 includes a reactor R2 having one end connected to the intermediate node placed between the switching elements S1 and S2, a reactor R3 having one end connected to the intermediate node placed between the switching elements S3 and S4, and a pair of capacitors C3 and C4 connected to the other ends of the reactors R2 and R3 in series.

The second switch SW2 switches a terminal to which the AC power is output from the second DC/AC inverter 22, between the second interconnection terminal 24 and the second self-standing terminal 25 based on an instruction from the second controller 23.

The second controller 23 controls the switch SW2. The second controller 23 makes AC power output from the second DC/AC inverter 22 be output from the second interconnection terminal 24 in case of a non-power outage, and makes AC power output from the second DC/AC inverter 22 be output from the second self-standing terminal 25 in case of a power outage. The determination of the power outage or the non-power outage by the second controller 23 may be performed by receiving a signal indicating whether or not power outage occurs, or by receiving a measured value of a grid voltage and comparing the measured value with a predetermined threshold. Further, the second controller 23 switches the operation mode of the second DC/DC converter 21 and the second DC/AC inverter 22, between the discharge mode and the charge mode in accordance with the measured value of the bus voltage $V_B$. Specifically, if the bus voltage $V_B$ exceeds 320V, which is a threshold TH, the second controller 23 sets the operation mode of the second DC/DC converter 21 and the second DC/AC inverter 22 to the charge mode, whereas if the bus voltage $V_B$ is lower than the threshold TH, the second controller 23 sets the operation mode to the discharge mode.

Figure 3:
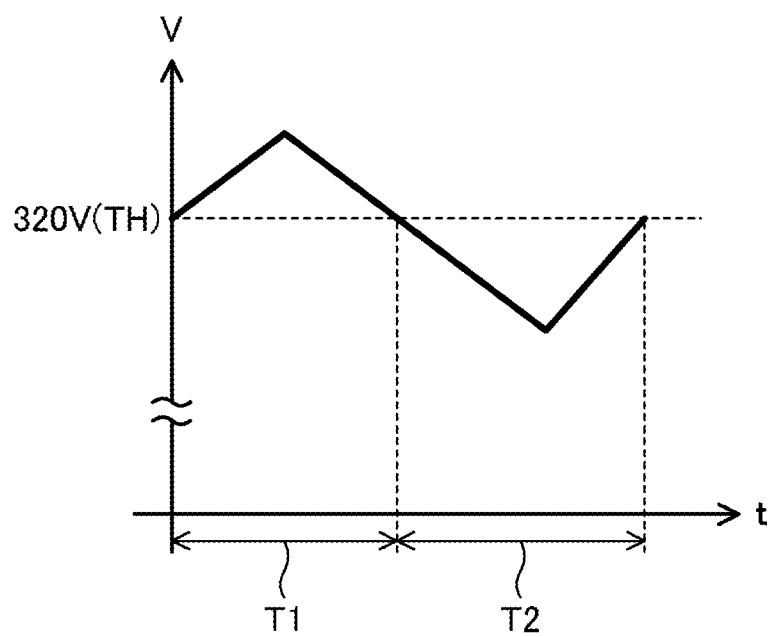
FIG. 3 is a graph illustrating an example a transition of a bus voltage.

As shown in FIG. 3, when transition of the bus voltage $V_B$ occurs, a time period indicated by the reference character T1 is a charging period, and a time period indicated by the reference character T2 is a discharging period.

The second controller 23 further detects a reverse power flow, based on the current I1 flowing from the first power conditioner 10 through the power grid 50. When the reverse power flow is detected, the second controller 23 does not make the second DC/DC converter 21 and the second DC/AC converter 22 operate in the discharge mode. In addition, when no reverse power flow is detected in a non-power outage of the power grid 50, the second controller 23 makes the second DC/DC converter 21 and the second DC/AC converter 22 output the voltage so as to follow the power consumed by the load 60.

The second controller 23 controls the second DC/DC converter 21 and the second DC/AC inverter 22 so that the state of charge (SOC) of the storage battery 70 becomes equal to or less than a threshold, which is less than 100%, while the AC power output from the second DC/AC inverter 22 is output from the second interconnection terminal 24. For example, the SOC of the storage battery 70 is controlled to be 30% to 80%. This makes it possible to reliably perform charging in case of a power outage.

The first connection switch 31 turns on and off the connection of the first interconnection terminal 14 of the first power conditioner 10 and the load 60 with the second interconnection terminal 24 of the second power conditioner 20 or the power grid 50.

The second connection switch 32 turns on and off the connection of the first interconnection terminal 14 of the first power conditioner 10 and the load 60 with the second self-standing terminal 25 of the second power conditioner 20.

The first and second connection switches 31 and 32 constitute a switching unit that switches a connection destination of the first interconnection terminal 14 of the first power conditioner and the load 60, between the power grid 50 and the second self-standing terminal 25 of the second power conditioner 20.

The connection controller 33 controls turning on and off of the first and second connection switches 31 and 32. Basically, the connection controller 33 turns on the first connection switch 31 and turns off the second connection switch 32 in the non-power outage of the power grid 50, whereas the connection controller 33 turns off the first connection switch 31 and turns on the second connection switch 32 in the power outage of the power grid 50. Specifically, the connection controller 33 executes, on the first and second connection switches 31 and 32, a first control for connecting the first interconnection terminal 14 of the first power conditioner 10 and the load 60 with the power grid 50 in the non-power outage of the power grid 50, and a second control for connecting the first interconnection terminal 14 of the first power conditioner 10 and the load 60 with the second self-standing terminal 25 of the second power conditioner 20 in the power outage of the power grid 50. Note that, when transition of the power grid 50 from the non-power outage to the power outage occurs, the connection controller 33 turns off the first connection switch 31 and turns on the second connection switch 32 after 5.7 seconds from start of the power outage.

Figure 4:
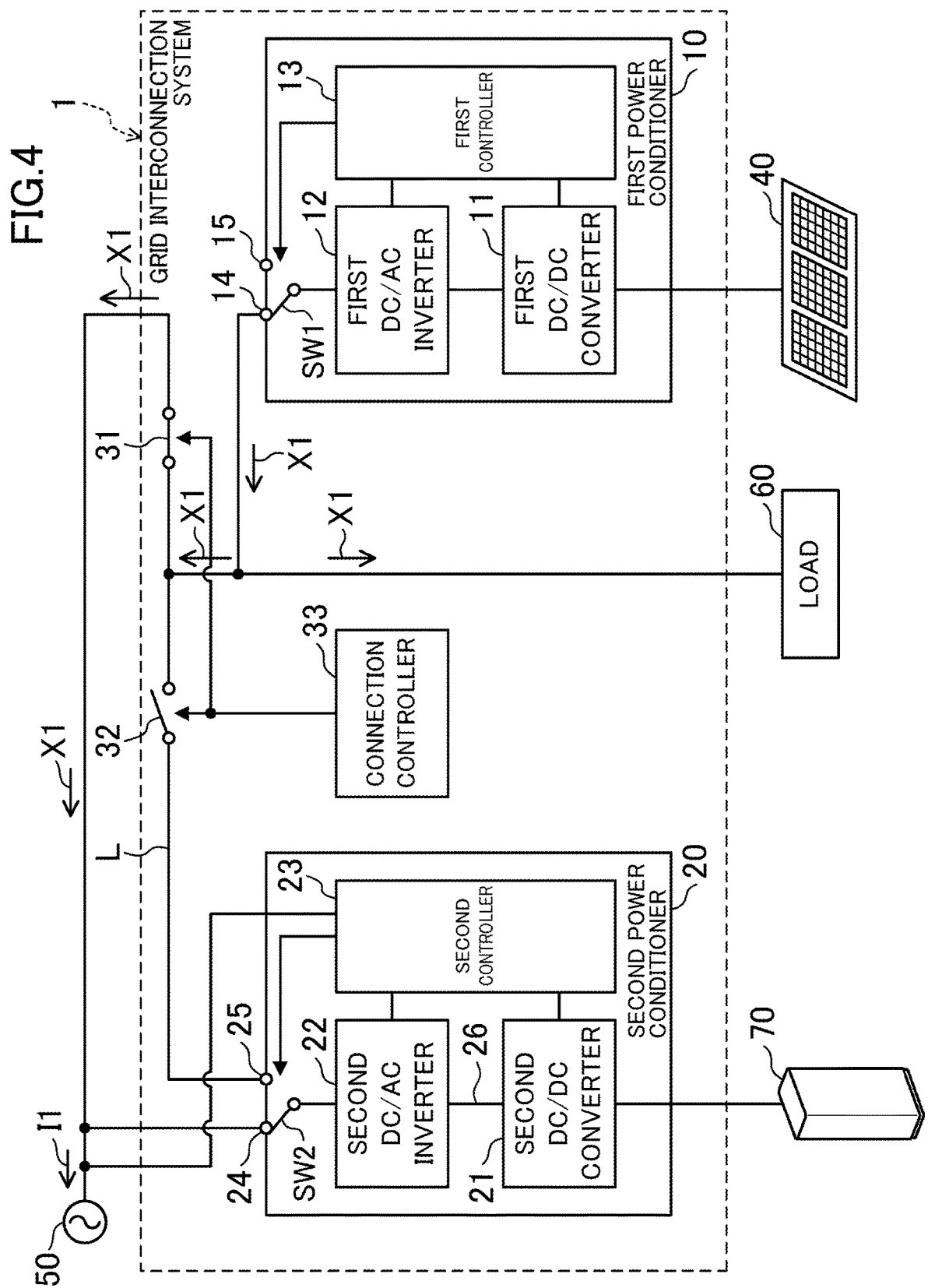
FIG. 4 is a view corresponding to FIG. 1 in the case in which output power of a first power conditioner exceeds power consumed by the load in a non-power outage.
Figure 5:
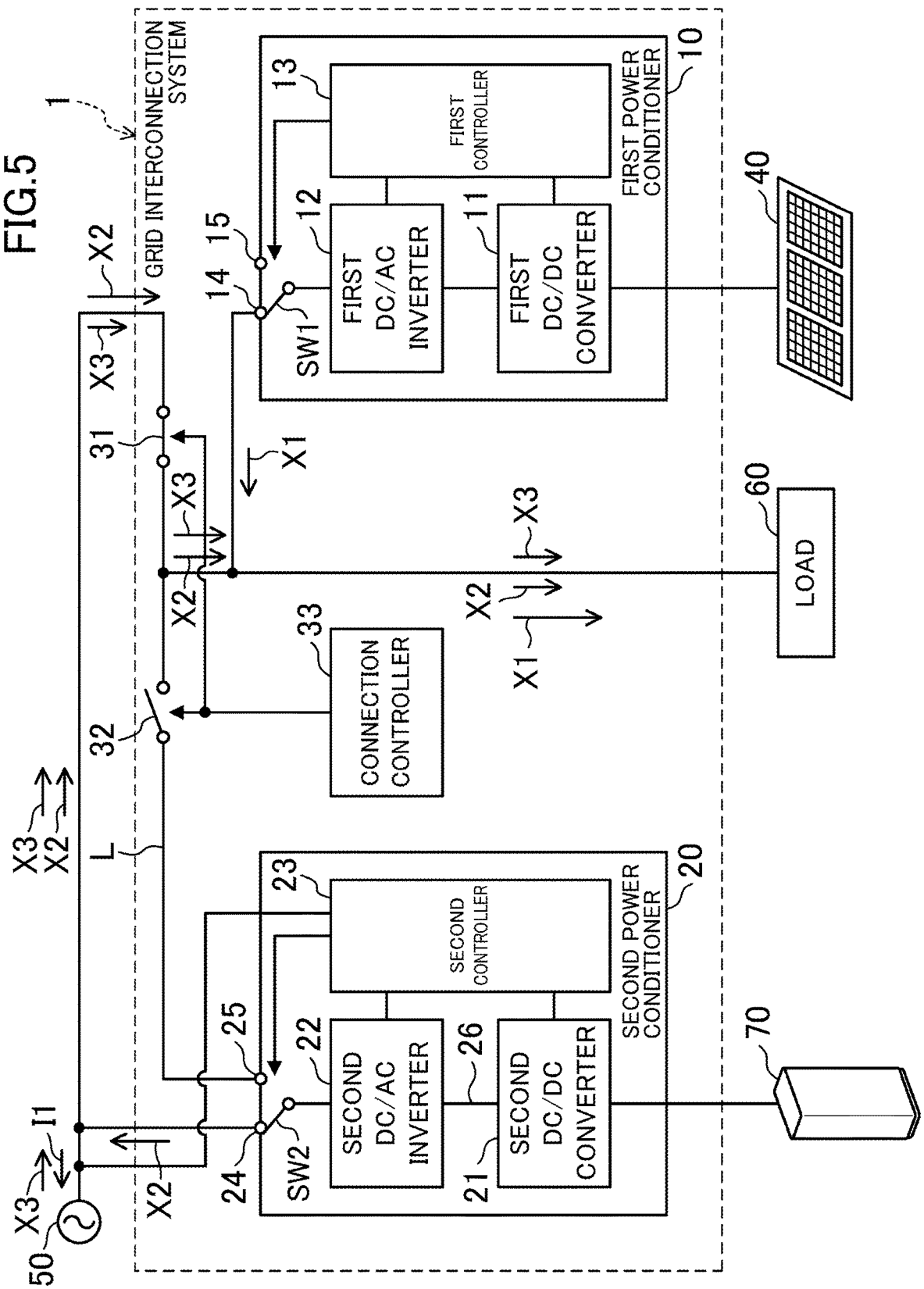
FIG. 5 is a view corresponding to FIG. 1 in the case in which output power of a first power conditioner is equal to or lower than power consumed by the load in the non-power outage.

Next, the operations of the grid interconnection system 1 configured as described above will be described with reference to FIGS. 4 to 7. First, as shown in FIGS. 4 and 5, the connection controller 33 turns on the first connection switch 31 and turns off the second connection switch 32 in the non-power outage of the power grid 50. That is, the first interconnection terminal 14 of the first power conditioner 10 and the load 60 are connected with the second interconnection terminal 24 of the second power conditioner 20 and the power grid 50. The first controller 13 controls the first switch SW 1 so as to output, from the first interconnection terminal 14, AC power output from the first DC/AC inverter 12. The second controller 23 of the second power conditioner 20 controls the second switch SW2 so as to output, from the second interconnection terminal 24, AC power output from the second DC/AC inverter 22. Since the first interconnection terminal 14 of the first power conditioner 10 is connected with the power grid 50 in the non-power outage, the first controller 13 of the first power conditioner 10 receives a measured value of a voltage at the first interconnection terminal 14, i.e., a grid voltage, generates a current command value of the active component based on the sine value at the phase angle of the grid voltage, and generates a current command value of the reactive component based on the cosine value at the phase angle of the grid voltage. The sine value and the cosine value at the phase angle of the grid voltage are obtained from PLL that receives the voltage at the first interconnection terminal 14 as an input signal. Then, the first controller 13 acquires an output current command value by summing the current command value of the active component and the current command value of the reactive component. Thus, the output current command value has the same phase as that of the grid voltage. Then, the first controller 13 performs feedback control of a PWM signal so that the value of the output current of the first DC/AC inverter 12 follows the output current command value. Accordingly, the first power conditioner 10 can be interconnected with the power grid 50. The power output from the first interconnection terminal 14 of the first power conditioner 10 exceeding the power consumed by the load 60 is sent to the load 60, and surplus power from the first power conditioner 10 is sent to the power grid 50. In FIGS. 4 to 7, the reference character X1 indicates the direction of the power sent from the first power conditioner 10, the reference character X2 indicates the direction of the power sent from the second power conditioner 20, and the reference character X3 indicates the direction of the power sent from the power grid 50. At this time, the second controller 23 of the second power conditioner 20 detects reverse power flow and does not make the second DC/DC converter 21 and the second DC/AC inverter 22 perform an operation of the discharge mode. Thus, the storage battery 70 does not discharge power.

When the power output from the first interconnection terminal 14 of the first power conditioner 10 is equal to or less than the power consumed by the load 60, the power output from the first interconnection terminal 14 of the first power conditioner 10, the power output from the second interconnection terminal 24 of the second power conditioner 20, and the power sent from the power grid 50 are supplied to the load 60 as shown in FIG. 5. Note that the second power conditioner 20 outputs power so as to follow the power consumed by the load 60 at this time.

Figure 6:
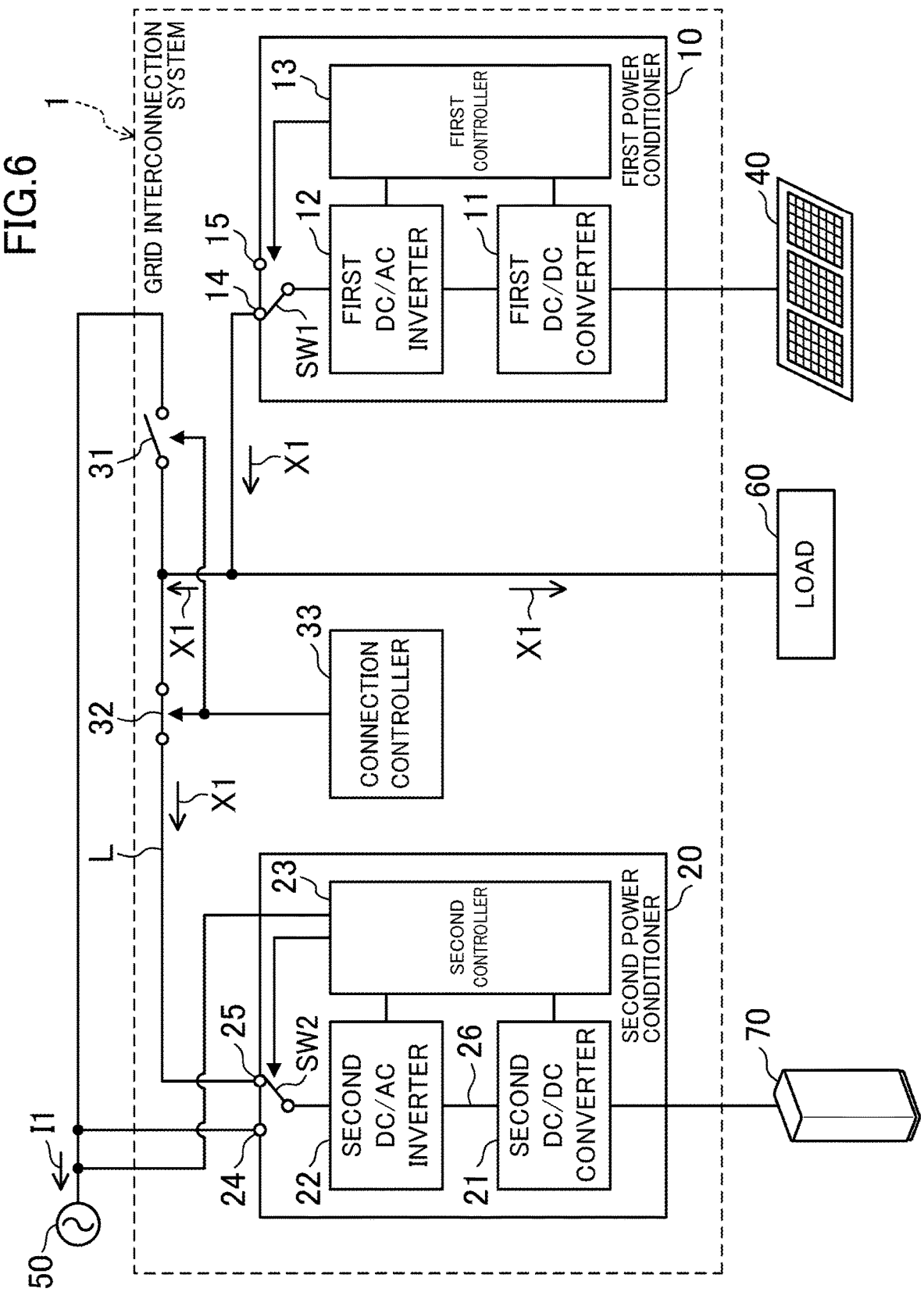
FIG. 6 is a view corresponding to FIG. 1 in the case in which output power of a first power conditioner exceeds power consumed by the load in a power outage.
Figure 7:
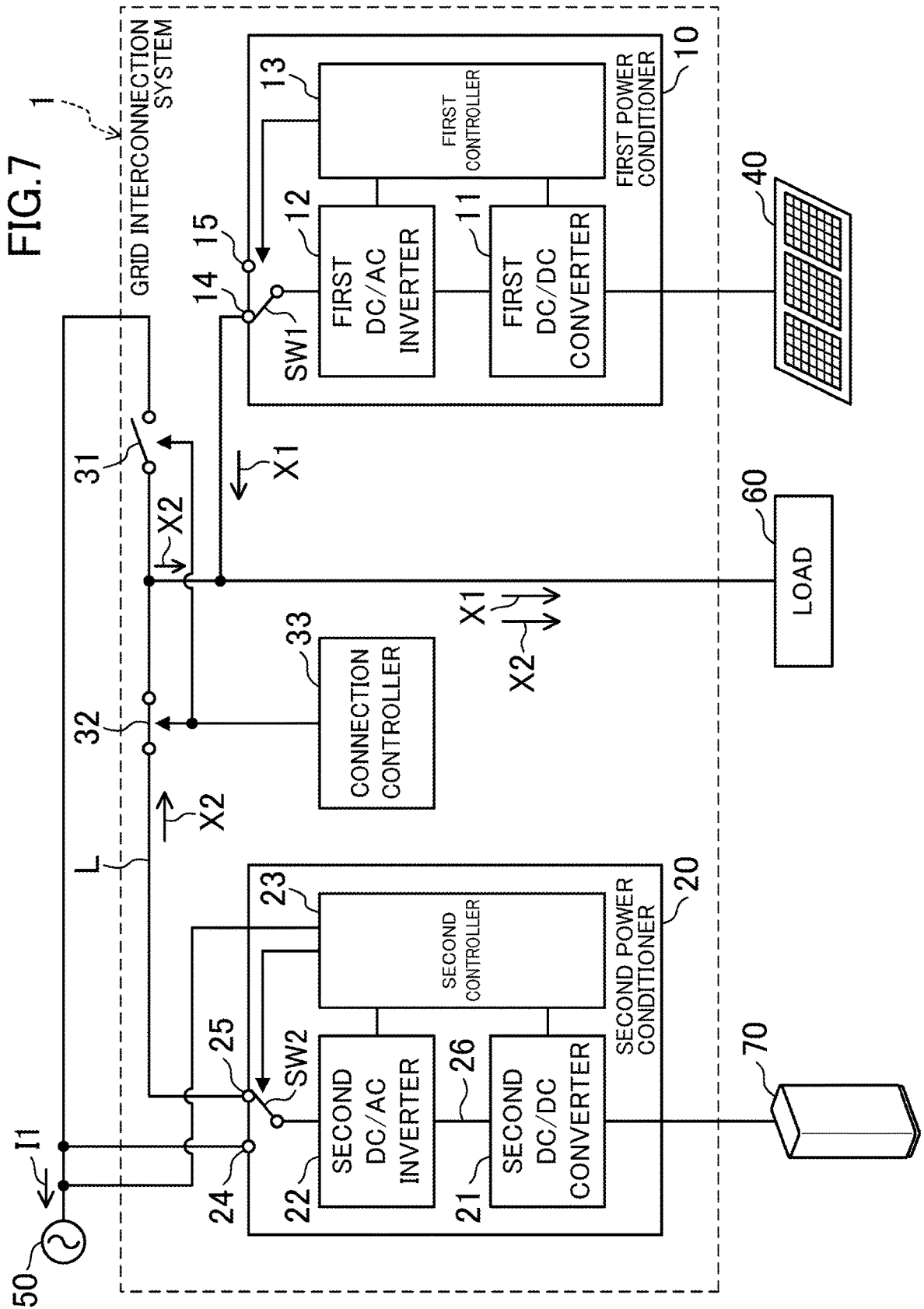
FIG. 7 is a view corresponding to FIG. 1 in the case in which output power at a first power conditioner is equal to or lower than power consumed by the load in a power outage.

The second controller 23 moves the second switch SW2 toward the second self-standing terminal 25 as shown in FIGS. 6 and 7 within 5 seconds from the transition of the power grid 50 from the non-power outage to the power outage. Further, the connection controller 33 turns off the first connection switch 31 and turns on the second connection switch 32 after 5.7 seconds from start of the power outage. Accordingly, the second self-standing terminal 25 of the second power conditioner 20 is connected with the first interconnection terminal 14 of the first power conditioner 10 and the load 60. Since the first interconnection terminal 14 of the first power conditioner 10 is connected with the second self-standing terminal 25 of the second power conditioner 20 in this manner, the first controller 13 of the first power conditioner 10 receives a measured value of a voltage at the first interconnection terminal 14, i.e., a voltage at the second self-standing terminal 25 of the second power conditioner 20, generates a current command value of the active component based on the sine value at the phase angle of the voltage at the second self-standing standing terminal 25, and generates a current command value of the reactive component based on the cosine value at the phase angle of the voltage at the second self-standing terminal 25. The sine and cosine values at the phase angle of the voltage at the second self-standing terminal 25 are obtained from PLL that receives the voltage at the first interconnection terminal 14 as an input signal. Then, the first controller 13 acquires an output current command value by summing the current command value of the active component and the current command value of the reactive component. Thus, the output current command value has the same phase as the voltage at the second self-standing terminal 25. Then, the first controller 13 performs feedback control of a PWM signal so that the value of the output current of the first DC/AC inverter 12 follows the output current command value. With such control, the first power conditioner 10 outputs, from the first interconnection terminal 14, an AC voltage having the same phase as the voltage at the second self-standing terminal 25 of the second power conditioner 20. Then, when the power output from the first interconnection terminal 14 of the first power conditioner 10 exceeds the power consumed by the load 60, the voltage $V_{AC}$ at a line L connecting the second self-standing terminal 25 of the second power conditioner 20 with the load 60 and the first interconnection terminal 14 of the first power conditioner 10 increases. Thus, the current I2 flows from the reactor R2 to the switching element S8 and the diode D1, and the bus voltage $V_B$ increases. When the bus voltage $V_B$ exceeds 320V, which is the threshold TH, the second controller 23 makes the second DC/DC converter 21 and the second DC/AC inverter 22 to start the operation of the charge mode. Accordingly, as shown in FIG. 6, the surplus power from the first power conditioner 10 is input to the second self-standing terminal 25, converted into DC power by the second power conditioner 20, and then supplied to the storage battery 70. Provided that the power output from the first interconnection terminal 14 of the first power conditioner 10 is PV, the power consumed by the load 60 is PL, and the power charged in the storage battery 70 is PB, the following equation 1 is established.

$$PB = PV - PL \qquad \text{(Eq. 1)}$$

When the bus voltage $V_B$ falls down to the threshold TH, which is 320V, by such charging, the second controller 23 makes the second DC/DC converter 21 and the second DC/AC inverter 22 to stop the operation of the charge mode.

On the other hand, when the power output from the first interconnection terminal 14 of the first power conditioner 10 is equal to or less than the power consumed by the load 60, the voltage $V_{AC}$ at the line L decreases, and when the bus voltage $V_B$ falls below the threshold TH, which is 320V, the second controller 23 makes the second DC/DC converter 21 and the second DC/AC inverter 22 to start the operation of the discharge mode. Thus, as shown in FIG. 7, the second power conditioner 20 converts the power stored in the storage battery 70 into AC power, and outputs the AC power to the load 60 from the second self-standing terminal 25. Accordingly, the power output from the first interconnection terminal 14 of the first power conditioner 10 and the power output from the second self-standing terminal 25 of the second power conditioner 20 are collectively supplied to the load 60. Provided that the power output from the first interconnection terminal 14 of the first power conditioner 10 is PV, the power output from the second self-standing terminal 25 of the second power conditioner 20 is PB, and the power consumed by the load 60 is PL, the following equation 2 is established.

$$PL=PV+PB \quad \text{(Eq. 2)}$$

When the bus voltage $V_B$ increases to the threshold TH by such discharging, the second controller 23 makes the second DC/DC converter 21 and the second DC/AC inverter 22 to stop the operation of the discharge mode. In this manner, the energy balance on the line L is maintained, and the output voltage at the second DC/AC inverter 22, i.e., a voltage at the line L, is maintained to be a stable constant voltage.

When the first self-standing terminal 15 of the first power conditioner 10 and the second self-standing terminal 25 of the second power conditioner 20 are connected to each other in the power outage of the power grid 50, the output voltage of the first self-standing terminal 15 has a different phase from that of the second self-standing terminal 25. This may cause overcurrent flowing through an internal circuit of the first power conditioner 10, which causes a breakage of the circuit. In contrast, in the present embodiment, the first interconnection terminal 14 of the first power conditioner 10 is connected with the second self-standing terminal 25 of the second power conditioner 20 in the power outage of the power grid 50. The first power conditioner 10 thus regards the voltage at the second self-standing terminal 25 of the second power conditioner 20 as a grid voltage, and outputs the AC voltage having the same phase as the voltage at the second self-standing terminal 25 from the first interconnection terminal 14. This makes it possible to avoid asynchronous input causing the overcurrent flowing through the first power conditioner 10. Further, it is not necessary to provide, in the first power conditioner 10, a configuration for keeping the overcurrent from flowing in the first power conditioner 10 in charging and discharging of the storage battery 70 separately from a configuration for interconnecting with the power grid 50. This allows the manufacturing costs to be reduced.

In the present embodiment, the second controller 23 switches the operation mode of the second DC/DC converter 21 and the second DC/AC inverter 22, between the discharge mode and the charge mode in accordance with the measured value of the bus voltage $V_B$. The operation mode may be switched in accordance with current flowing between the second self-standing terminal 25 and the reactors R1 to R3, i.e., current flowing through portions indicated by the reference characters P1 to P3 in FIG. 2 in the second DC/AC inverter 22. Specifically, when current flows from the second self-standing terminal 25 side toward the inside of the second DC/AC inverter 22, i.e., toward the bridge circuit 28 side and the half-bridge circuit 29 side (left side in FIG. 2) in the portions indicated by the reference numerals P1 to P3, the operation mode is switched to the charge mode, and when current flows toward the opposite side, the operation mode may be switched to the discharge mode.

Further, the second controller 23 may switch the operation mode in accordance with the voltage $V_B'$ at the capacitor C2 or the voltage $V_{AC}$ at the second self-standing terminal 25. The operation mode may be switched in accordance with measured values of two or more of the bus voltage $V_B$, the voltage $V_B'$ at the capacitor C2, the voltage $V_{AC}$ at the second self-standing terminal 25, and the current flowing between the second self-standing terminal 25 and the reactors R1 to R3.

In the above-described embodiment, the solar battery panel 40 is used as a power generation unit. However, a power generator utilizing renewable energy other than sunlight, such as wind power, or a cogeneration system may be used as the power generation unit.

The present disclosure is useful as a grid interconnection system capable of supplying power to a load in case of the power outage of a power grid.

What is claimed is:

1. A grid interconnection system comprising:
   a first power conditioner configured to convert DC power output from a power generation unit to AC power corresponding to a voltage at an interconnection terminal and to output the AC power from the interconnection terminal to a load, and to be interconnected with a power grid when the power grid is connected to the interconnection terminal;
   a second power conditioner capable of being actuated both in a discharge mode for converting DC power stored in a storage battery to AC power and outputting the AC power from a self-standing terminal to the load and in a charge mode for converting AC power input to the self-standing terminal to DC power and supplying the DC power to the storage battery;
   a switching unit configured to switch a connection destination of the interconnection terminal of the first power conditioner and the load, between the power grid and the self-standing terminal of the second power conditioner, and
   a connection controller configured to execute, on the switching unit, first control for connecting the power grid to the interconnection terminal of the first power conditioner and the load in a non-power outage of the power grid, and second control for connecting the self-standing terminal of the second power conditioner to the interconnection terminal of the first power conditioner and the load in a power outage of the power grid.

2. The grid interconnection system of claim 1, wherein the second power conditioner includes:
   a DC/DC converter configured to convert an output voltage at the storage battery to a predetermined voltage and output the predetermined voltage to a DC bus in the discharge mode, and to convert a bus voltage at the DC bus and output a charging voltage at the storage battery in the charge mode;
   a DC/AC inverter configured to convert the bus voltage to an AC voltage and output the AC voltage from the self-standing terminal in the discharge mode, and to convert the AC voltage input to the self-standing terminal to a DC voltage and outputs the DC voltage to the DC bus in the charge mode; and
   a mode controller configured to switch an operation mode of the DC/DC converter and the DC/AC inverter, between the discharge mode and the charge mode in accordance with a measured value of at least one of the bus voltage, a voltage at the self-standing terminal, or a current in the DC/AC inverter.

3. The grid interconnection system of claim 2, wherein the measured value is of the bus voltage, and the mode controller brings the operation mode to the charge mode if the bus voltage exceeds a predetermined threshold, and to the discharge mode if the bus voltage is lower than the predetermined threshold.

4. The grid interconnection system of claim 1, wherein the second power conditioner includes:

a first DC/DC converter configured to convert an output voltage of the power generation unit to a first predetermined voltage and output the first predetermined voltage, and a first DC/AC inverter configured to convert an output voltage at the first DC/DC converter into an AC voltage and output the AC voltage, and the second power conditioner includes:

a second DC/DC converter configured to convert an output voltage at the storage battery to a second predetermined voltage and output the second predetermined voltage to a DC bus in the discharge mode, and to convert a bus voltage at the DC bus and output a charging voltage at the storage battery in the charge mode, and a second DC/AC inverter configured to convert the bus voltage to an AC voltage and output the AC voltage from the self-standing terminal in the discharge mode, and to convert the AC voltage input to the self-standing terminal to a DC voltage and outputs the DC voltage to the DC bus in the charge mode.

5. The grid interconnection system of claim 4, wherein the second power conditioner further includes:

a mode controller configured to switch an operation mode of the second DC/DC converter and the second DC/AC inverter, between the discharge mode and the charge mode in accordance with a measured value of at least one of the bus voltage, a voltage at the self-standing terminal, or a current in the second DC/AC inverter.

6. The grid interconnection system of claim 5, wherein the measured value is of the bus voltage, and the mode controller brings the operation mode to the charge mode if the bus voltage exceeds a predetermined threshold, and to the discharge mode if the bus voltage is lower than the predetermined threshold.

* * * * *